US012757092B2

(12) United States Patent
Tischler et al.

(10) Patent No.: US 12,757,092 B2
(45) Date of Patent: Oct. 6, 2026

(54) SYSTEMS AND METHODS FOR PERFORMING ROAMING AND HANDOVER LOAD BALANCING IN A MULTICELL NETWORK

(71) Applicant: VTech Telecommunications Limited, Hong Kong (CN)

(72) Inventors: Ralph Tischler, Richmond (CA); Chung Shing Lam, Hong Kong (CN)

(73) Assignee: VTECH TELECOMMUNICATIONS LIMITED, Hong Kong (CN)

( * ) Notice: Subject to any disclaimer, the term of this patent is extended or adjusted under 35 U.S.C. 154(b) by 280 days.

(21) Appl. No.: 18/394,786

(22) Filed: Dec. 22, 2023

(65) Prior Publication Data

US 2025/0212076 A1 Jun. 26, 2025

(51) Int. Cl.
*H04W 36/22* (2009.01)
*H04W 8/08* (2009.01)
(Continued)

(52) U.S. Cl.
CPC ............. *H04W 36/22* (2013.01); *H04W 8/08* (2013.01); *H04W 36/00833* (2023.05); *H04W 36/30* (2013.01)

(58) Field of Classification Search
CPC . H04W 36/22; H04W 8/08; H04W 36/00833; H04W 36/30
See application file for complete search history.

(56) References Cited

U.S. PATENT DOCUMENTS 6,263,203 B1 * 7/2001 Jahn ...................... H04W 36/18 370/332
6,359,871 B1 * 3/2002 Chung ................ H04B 7/2609 370/404
(Continued)

FOREIGN PATENT DOCUMENTS

WO 2005/081499 A1 9/2005
WO 2019/210082 A1 10/2019
WO 2023/105292 A1 6/2023

OTHER PUBLICATIONS

"Digital Enhanced Cordless Telecommunications (DECT); New Generation DECT Phase 1; Part 2: IP Data Service", European H04L Telecommunications Standards Institute (ETSI), Draft ETSI TS 102 527-2 V0.02, Feb. 21, 2007, pp. 1-34.
(Continued)

*Primary Examiner* — Christine Ng
(74) *Attorney, Agent, or Firm* — STEPTOE LLP; Carl B. Wischhusen

(57) ABSTRACT

A method of performing roaming and handover load balancing in a multicell wireless communication network that comprises one or more base stations, each base having a number of call slots to communicate with wireless terminals. The method includes receiving, at a terminal, a broadcast from a base, of the one or more bases, providing capacity information for the one or more bases. The capacity information comprises terminal localization status information and active call handover status information for the one or more bases. The method also includes storing the capacity information in a database at the terminal. The method further includes receiving a roaming or handover request based on signal strength and/or link quality directing the terminal to roam or handover a call to a target base; and overriding the roaming or handover request, to prevent roaming or han-
(Continued)

dover to the target base, based on the stored capacity information.

20 Claims, 4 Drawing Sheets

(51) Int. Cl.
*H04W 36/00* (2009.01)
*H04W 36/30* (2009.01)

(56) References Cited

U.S. PATENT DOCUMENTS

| | | | | |
|---|---|---|---|---|
| 2005/0276237 | A1 | 12/2005 | Segal et al. | |
| 2006/0007930 | A1 | 1/2006 | Dorenbosch | |
| 2006/0072532 | A1 | 4/2006 | Dorenbosch et al. | |
| 2006/0154675 | A1 | 7/2006 | Chapman et al. | |
| 2008/0096566 | A1 * | 4/2008 | Brunner | A61P 43/00 455/437 |
| 2011/0281581 | A1 * | 11/2011 | Brandt | H04W 36/08 455/427 |
| 2013/0324112 | A1 | 12/2013 | Jechoux et al. | |
| 2015/0319664 | A1 * | 11/2015 | Perras | H04W 36/22 370/331 |
| 2016/0345230 | A1 * | 11/2016 | Cuevas Ramirez | H04W 36/144 |
| 2018/0368082 | A1 | 12/2018 | O'Shea et al. | |
| 2021/0377828 | A1 * | 12/2021 | Tao | H04W 36/0058 |
| 2022/0248256 | A1 * | 8/2022 | Lee | H04W 28/0268 |
| 2023/0073247 | A1 * | 3/2023 | Prasad | H04W 48/06 |
| 2024/0259055 | A1 * | 8/2024 | Miranda | H04B 7/043 |
| 2025/0088315 | A1 | 3/2025 | Dimou et al. | |

OTHER PUBLICATIONS

System Multicell: "Gigaset N720 DECT IP Multicell System, Installation, configuration and operation", Jan. 1, 2015, 139 pages, http://gse.gigaset.com/fileadmin/legacy-assets/CustomerCare/Manuals/PRO/N720_PRO/A31008-M2314-L101-5-7619_en_UK_IE.pdf.

Extended European search report from European Patent Application No. 24217155.1, May 7, 2025, 11 pages.

Extended European search report from European Patent Application No. 24217373.0, May 14, 2025, 10 pages.

Extended European search report from European Patent Application No. 24217218.7, May 16, 2025, 7 pages.

Extended European search report from European Patent Application No. 25150321.5, Jun. 12, 2025, 9 pages.

* cited by examiner

SYSTEMS AND METHODS FOR PERFORMING ROAMING AND HANDOVER LOAD BALANCING IN A MULTICELL NETWORK

BACKGROUND

Technical Field

The present disclosure generally relates to performing roaming and handover load balancing in a multicell network that includes a primary base station in communication with one or more secondary base stations providing communication among wireless terminals.

Description of the Related Art

A wireless network may include one or more base stations ("bases") in communication with one or more wireless terminals. In a multi-base wireless network, the wireless base stations are interconnected. In one particular example, a network comprises a primary base station and may include one or more secondary base stations. A number of terminals connect wirelessly, i.e., "localize," to these base stations. When a terminal (e.g., a handset) is localized to a base station, it has undergone a registration process where it identifies itself to the base station and is recognized by it. This process typically involves the exchange of identification and authentication information. Being "localized" means that the terminal has established a link with the base station, which is used for communications with the terminal, including voice, data, and signaling.

During operation, the terminals may move from one base to another. In particular, wireless terminals may "roam" between bases when idle (not on a call), or they may "handover" calls from one base to another while on an active call. Reasons for roaming and/or handover include relative signal strength and/or link quality measurements among the bases. However, there are drawbacks to existing systems and methods that perform roaming and handover functions. A base station has a limited number of call slots or "slots" available to accept an incoming terminal roaming or handover operation. This can lead to problems when a terminal has roamed to a new base, or has been handed over to a new base, that does not have any available slots to accommodate the terminal. Existing systems and methods do not efficiently and effectively account for this issue which can lead to various problems as discussed further herein.

SUMMARY

Disclosed embodiments are directed to improving load balancing in a multicell network during roaming and handover of wireless terminals among the bases.

As noted above, in a typical network the wireless terminals roam between bases when idle, or may be handed off from one base to another when on an active call. This is done for various reasons including relative link quality measurements and/or signal strength among the bases. For example, a terminal may switch to a new base that has a higher signal strength.

A base has a set number of call slots (e.g., 8 slots) for terminals to be connected, plus a set number of extra slots (e.g., 2-3 extra slots) for terminals that roam/handover to a new base from other bases. (It is of course to be understood that the numbers of slots discussed herein are just examples and that the numbers of slots and/or extra slots on various bases are not limited to these examples. The roaming/handover processes are controlled by the terminals. If all of the slots in the new or "target base" are occupied, then the terminal roaming/handover will be rejected by the target base. However, one problem with existing approaches is that the terminal roaming/handover is rejected by the target base only after the terminal has already localized to the target base. Accordingly, the terminal then gets returned or forced back to the original base. This existing process is not optimal for a number of reasons. For example, the existing process may cause a terminal to continually localize to a new base and then be forced back to the initial base, which wastes battery life and can also cause delays in call setup. For a handover, the existing process may cause interruptions in the call that the terminal is handling.

Disclosed embodiments are directed to improving and optimizing load balancing when terminals roam among bases, or when terminals hand off among bases. Such load balancing can be made more efficient and effective as described further herein.

Technical solutions and advantages are realized throughout the application.

The systems and methods described herein, in embodiments, use distributed logic that runs on top of the normal protocol on the terminal, and the distributed logic accesses information from a shared database that is essentially shared among all bases and terminals. The shared database keeps track of how many terminals are localized to each base, and how many terminals are on a handover call on each base. This type of information stored in the shared database is referred to herein as capacity information. The stored capacity information enables a terminal attempting to switch to a new base to determine whether the new base has an open call slot for roaming or handover. If there is an open call slot on the new base then the terminal will switch to the new base as per normal operation. If, however, there is no open call slot on the new base then the distributed logic will override the roaming or handover request, to prevent roaming or handover to the new base. Accordingly, if there are too many terminals already localized to the new base and/or on a handover call on the new base then the system and method will, in effect, override the normal roaming or handover decision made by the terminal; the system and method will direct the terminal not to roam or handover to the new base at that time. The terminal will therefore remain at the initial base, after which the terminal may begin a new process for determining whether to roam or handover to another base.

By virtue of the features of the disclosed embodiments, a terminal can be prevented from continually localizing to a new/target base and then being returned or bounced back to the initial base. In this way, battery life of a terminal can be improved, and delays in call setup can be ameliorated or avoided. Further, interruptions in a call caused by the handover process can be reduced or eliminated.

In one example embodiment the present disclosure is directed to a method of performing roaming and handover load balancing in a multicell wireless communication network. The network includes one or more base stations, each base station having a number of call slots to communicate with wireless terminals. The method includes receiving, at a wireless terminal, a broadcast from a base station, of the one or more base stations, providing capacity information for the one or more base stations. The capacity information comprises wireless terminal localization status information and active call handover status information for the one or more base stations. The method also includes storing the capacity information in a database at the wireless terminal. The method further includes receiving a roaming or handover request based on at least one of signal strength and link quality directing the wireless terminal to roam or handover a call to a target base station; and overriding the roaming or handover request, to prevent roaming or handover to the target base station, based at least in part on the stored capacity information.

The wireless terminal localization status information may specify a number of wireless terminals currently localized to each of the one or more base stations. The active call handover status information may specify a number of active call handovers at each of the one or more base stations.

The capacity information may be continually broadcast by the base station to all of the wireless terminal associated with the base station. In example embodiments the capacity information is obtained from a shared database of the base station which comprises capacity information of other base stations of the one or more base stations. The shared database of capacity information may be stored at each of the one or more base stations.

In example embodiments, the roaming or handover request is overridden if the stored capacity information of the base station indicates that the target base station does not have an open call slot for roaming or handover, respectively.

Figure 1:
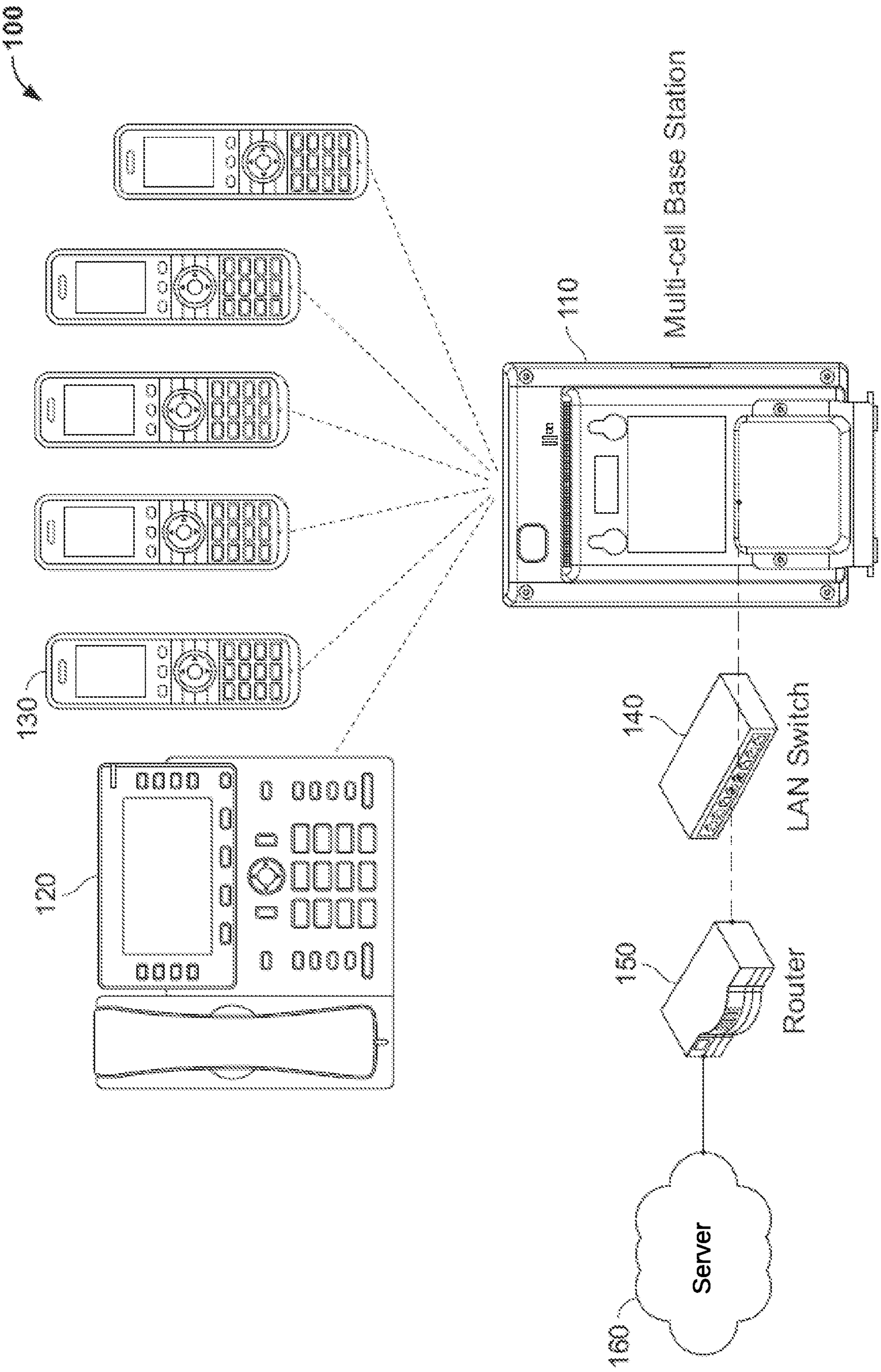
FIG. 1 depicts a set of equipment for a Digital Enhanced Cordless Telecommunications (DECT) system including a multicell base station and a number of wireless terminals, the system adapted for performing roaming and handover load balancing of wireless terminals.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the present teachings. However, it will be understood by those of ordinary skill in the art that the presently taught approaches and the example embodiments provided herein may be practiced without these specific details. In other instances, well-known methods, procedures, components, and circuits have not been described in detail so as not to obscure the presently taught approaches and techniques.

FIG. 1 depicts a set of equipment 100 for a Digital Enhanced Cordless Telecommunications (DECT) system including a multicell base station 110 and a number of wireless terminals (120, 130), the system adapted for efficiently and effectively performing roaming and handover load balancing of the wireless terminals (120, 130) among the base stations in the system.

In the example depicted in FIG. 1, the base station 110 is set up to communicate with a cordless deskset 120 and a number of cordless handsets 130. In some cases, the base station 110 may be connected to a local area network (LAN) switch 140, which is in communication with a router 150. The router 150, in turn, is connected to an end or external server 160, such as a hosted Internet Protocol (IP) private branch exchange (PBX) which provides access to the public switched telephone network. In embodiments, there are multiple base stations 110 and wireless communication terminals (120, 130). The wireless terminals (120, 130) may roam among base stations 110 during operation. The wireless terminals (120, 130) may also handover calls from one base station 110 to another while on an active call. In embodiments, one base station is set up as a primary base station and all other base stations are set up as secondary base stations.

Figure 2:
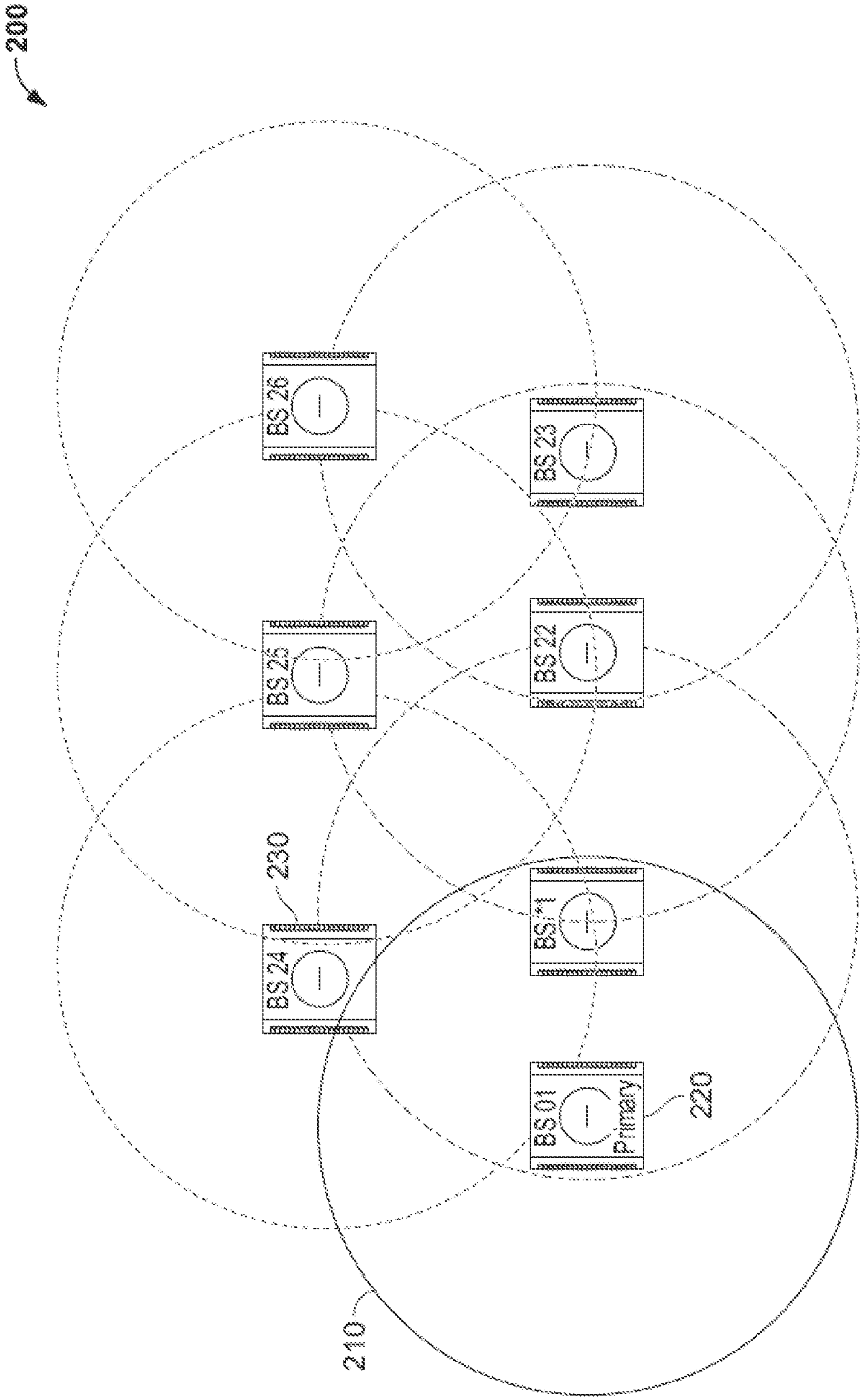
FIG. 2 depicts a primary base station and a number of secondary base stations of a DECT multicell system, each of which is responsible for communicating with wireless terminals.

FIG. 2 depicts a primary base station 220 and a number of secondary base stations 230 of a DECT multicell system 200, each of which is responsible for communicating with wireless terminals, e.g., cordless handsets 130 (see FIG. 1), within a specific area or "cell" 210. Each cell 210 overlaps with the neighboring cells to ensure there are no gaps in coverage. When a handset 130 is first used in the system 200, it is registered with the base stations (220, 230), which record its unique ID. Generally, when the handset 130 makes a call, the closest base station (220, 230) sets up the call, i.e., the base station (220, 230) to which the handset 130 is "localized." This process is facilitated through a frequency/time slot pattern, with each base station (220, 230) and handset pairing given a unique pattern to avoid interference. As a handset 130 moves from the coverage area, i.e., cell 210, of one base station (220, 230) to another, the system performs a handover or roaming operation. This involves the base station with a weakening signal handing over the connection to the base station where the signal is getting stronger.

DECT uses Time Division Multiple Access (TDMA) to allow multiple handsets to communicate with the base station simultaneously. It divides the communication channel into multiple time slots, and each handset is assigned a specific time slot in which to transmit and receive information. DECT systems use encryption to secure the communications between the handsets and base stations. The DECT standard specifies the use of the DECT Standard Authentication Algorithm (DSAA) for authentication and the DECT Standard Cipher (DSC) for encryption.

In a DECT multicell system there are a limited number of operational TDMA slots to be able to use for the establishment of a call connection between a base and a wireless terminal. In a multicell system, wireless terminals may roam between bases when idle (not on a call), or they may handover calls from one base to another (while on an active call). The roaming and handover operations are discussed in further detail below.

Roaming is the ability of a wireless DECT terminal (120, 130) (also referred to as a "Portable Part" or PP) to be able to select, via an algorithm, any of the particular DECT base stations 110 to which the terminal (120, 130) has been registered, via the appropriate Radio Fixed Part Identity (RFPI) and Radio Fixed Part Number (RPN). Roaming takes place without any active calls or DECT connection and generally while the DECT terminal (120, 130) is in an idle state (i.e., is not on a call). Roaming selection criteria of disclosed embodiments revolves around factors such as relative signal strength among the bases and/or link quality measurements, as well as available space for a new PP on the new base station.

In embodiments, a target base station (e.g., the primary base station 220) may have 8 slots available for terminals to connect to the target base station, plus 2 extra slots for terminals that roam/handover to the target base station from other bases. (It is to be understood that this is just an example and the numbers of slots or extra slots on a base may vary.) Once 8 terminals have localized to the target base station (e.g., 220) and, thus, the target base station is at capacity, disclosed embodiments provide a mechanism to prevent additional terminals from localizing to the target base station. For example, if a terminal is currently localized to a particular originating base station (e.g., a secondary base station 230) and the RSSI of the target base station (e.g., 220) is higher than that of the originating base station (e.g., 230), but the target base station does not have a slot available for another terminal, then the disclosed technology provides a mechanism to prevent the terminal at the originating base station (e.g., 230) from localizing to the target base station (e.g., 220). Conventional techniques do not provide such a feature.

If more than 8 terminals localize, or attempt to localize, to a target base station (e.g., 220), then the slot capacity of the target base would be exceeded and the system may not be able to set up calls to all terminals and/or ring all of the terminals at the same time. In conventional approaches, the DECT system has a protocol for rejecting the "excess" terminals attempting to roam to the target base (e.g., 220), but only after the roaming terminal has localized to the target base station. Thus, in conventional techniques roaming terminals localize to the target base station, but thereafter the target base station at capacity will reject them, and the terminals will then be forced to localize back to the originating base station (e.g., 230). This can lead to a terminal constantly localizing to a target base station and being forced back to an originating base station, which wastes battery life and may also cause delays in call setup. The disclosed technology ameliorates such problems.

Handover is the ability to re-establish a DECT connection with a new target base to which it has been registered via the appropriate RFPI and RPN and with better signal strength and/or link quality with a call in progress. During a handover the DECT connection carrying data or media is transferred over to a new, i.e., target, base station and terminated at the old, i.e., originating, base station.

As discussed above, a base station has a number of "extra" call slots, in addition to a core number of call slots to be allocated. In one example, a base may have 2 additional call slots in addition to the core 8 call slots to be allocated, for a total of 10 call slots. (In other examples, there may be 3 additional call slots for a total of 11 call slots, or various other combinations depending on system requirements.) One purpose of the additional call slots is to allow wireless terminals to handover a call to another base, i.e., initiate a handover operation, if the RSSI of their current base is too low and the wireless terminal determines that there is a better RSSI on another base station. However, a problem arises when the number of terminals attempting to handover to a target base exceeds the number of additional call slots on the target base. In conventional methods, the terminals exceeding the number of additional call slots on the target base would not be able to make or receive calls. The DECT protocol can reject any additional terminal(s) for which there is no available call slot, but only after the terminal has localized to the target base. This can cause the audio on such a call to have an interruption, and the terminal(s) may continuously attempt to hand over to a target base with a better RSSI, causing problems such as continuous audio interruptions. The disclosed technology can solve these technical problems associated with conventional methods.

To further illustrate the example given above, if there is a target base with 2 additional call slots, a problem arises if more than 2 additional wireless terminals, e.g., 3 additional wireless terminals, attempt to hand over to the target base. If handled as in conventional methods, then 11 terminals are associated with a base that can only supply a maximum of 10 call slots. In such a case, one of the terminals would not be able to make or receive calls. Again, the DECT protocol can reject the 11th terminal, but only after it has localized to the target base. This can cause the audio on the call to have an interruption, and the terminal may continuously attempt to hand over to the target base with a better RSSI, causing problems such as continuous audio interruptions. The disclosed technology is directed to solving the technical problems associated with conventional methods.

Figure 3:
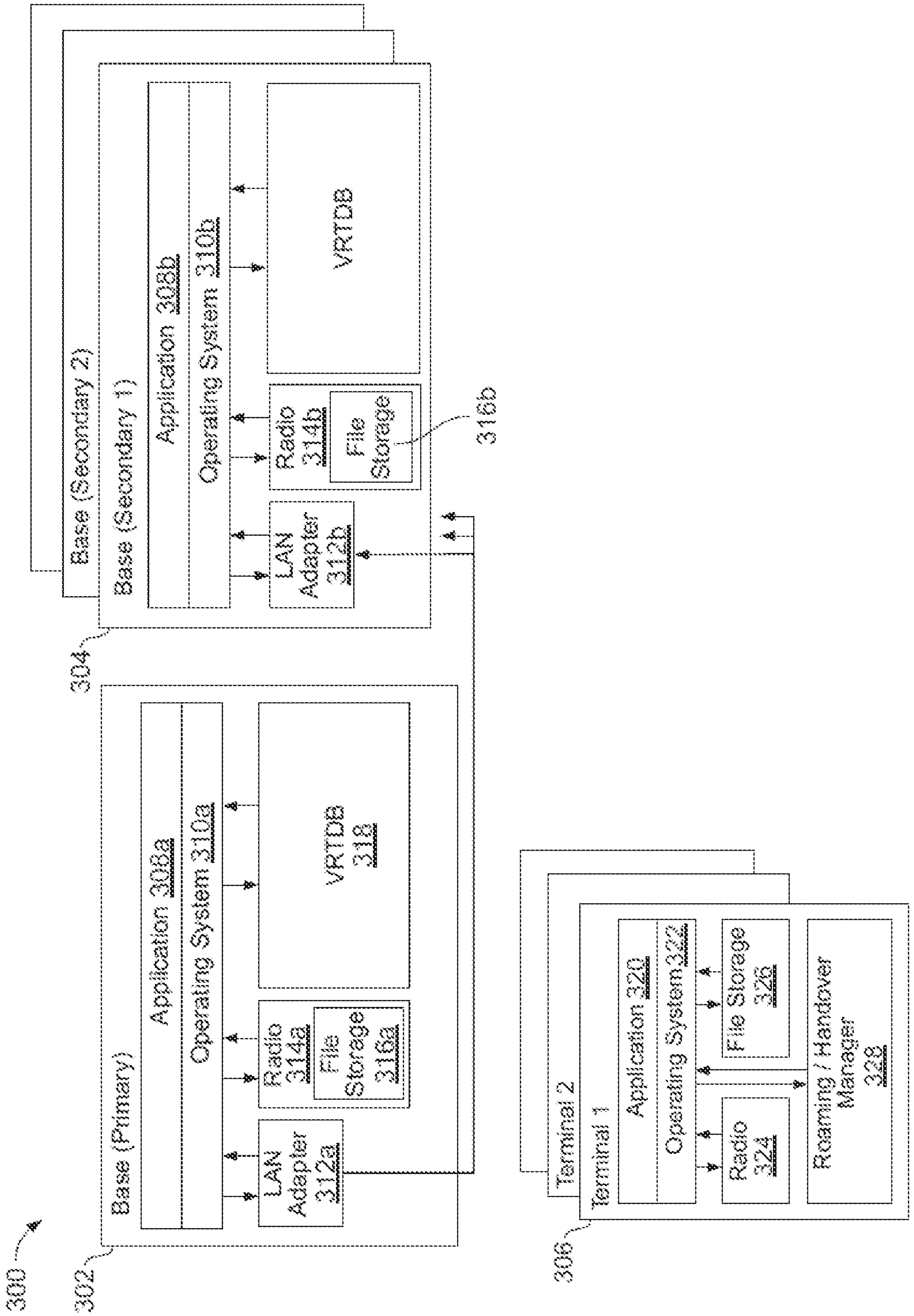
FIG. 3 depicts a system including a primary base station, one or more secondary base stations, and one or more wireless terminals for efficiently and effectively performing roaming and handover load balancing in a multicell network, according to an example embodiment.

FIG. 3 depicts a system 300 including a primary base station 302, one or more secondary base stations 304, and one or more wireless terminals 306, for efficiently and effectively performing roaming and handover load balancing in a multicell network, according to an example embodiment. The system 300 may be, for example, a DECT system as described above in FIGS. 1 and 2.

In the system 300 of FIG. 3, there is a shared database, e.g., a Volatile Run-Time Database (VRTDB) 318, described further below, that is shared among the base stations 302, 304, and each wireless terminal 306 has a roaming/handover manager (referred to herein as "handover manager") 328 executing thereon, e.g., as computer instructions executing on one or more processors of the wireless terminal 328. The shared database stores capacity information for the base stations 302, 304 in the system 300. The capacity information includes information indicating wireless terminal localization status and active call handover status for the base stations 302, 304. The capacity information is continually broadcast from respective base stations 302, 304 to the wireless terminals 306 associated with the respective base stations. Thus, the capacity information is broadcast from all base stations 302, 304 in the network to all wireless terminals 306 attached to, and/or within broadcast range of, a base station 302, 304. In embodiments, each base station 302, 304 broadcasting the capacity information may use the "dummy bearer" broadcast channel to continuously broadcast the capacity information to the wireless terminals 306 associated with the respective base station. The wireless terminals 306 store the received capacity information in a data storage, such as file storage 326, and the handover manager 328 makes override decisions based at least in part on the received capacity information, as described further below.

In embodiments, the primary base station 302 comprises an application 308*a* for carrying out various functions of the base station (e.g., call control), an operating system 310*a*, and a LAN adapter 312*a*. A radio 314*a* receives files, which may be stored in file storage 316*a*. The primary base station 302 further comprises a shared database, i.e., Volatile Real-Time Database (VRTDB) 318, which is described in further detail below.

Each secondary base station 304 comprises an application 308*b* for carrying out various functions of the base station, an operating system 310*b*, and a LAN adaptor 312*b*. A radio 314*b* receives files, e.g., from the primary base station 302, which may be stored in file storage 316*b*. As described further below, each secondary base station 304 is enabled to update the site-wide VRTDB 318 with information received from terminals 306.

Each wireless terminal 306 has an application 320 for performing the various functions of the wireless terminal (e.g., in accordance with DECT protocol), an operating system 322, a radio 324, a file storage 326, and a roaming/handover manager (referred to herein as "handover manager") 328. During operation of the system, the radio 324 may receive files from bases to which the terminal is attached.

Disclosed embodiments can resolve the issues or drawbacks discussed above, caused when a terminal roams or hands over to a base that is already at full slot capacity. In embodiments, a broadcast channel of each base station, e.g., the dummy bearer channel, continuously broadcasts real-time information about the status of each base station 302, 304 to all of the wireless terminals 306 in the system 300 which are in range of the broadcast channels of the respective base stations.

Thus, a base station, e.g., the primary base station 302, broadcasts to wireless terminals 306 capacity information for the one or more base stations 302, 304. The capacity information may include wireless terminal localization status information for the one or more base stations (e.g., 302, 304), which is information that specifies a number of wireless terminals 306 currently localized to each of the one or more base stations. The capacity information may also include active call handover status information for the one or more base stations, which is information that specifies the number of active call handovers at each of the one or more base stations.

The wireless terminals 306 may receive this broadcast and store the capacity information in a storage in the terminals 306, such as in a file storage 326. This, in effect, enables a wireless terminal 306 to continuously monitor the capacity information, and form its own database, for all the base stations (e.g., 302, 304) in the system 300, including information regarding how many terminals 306 are currently localized to a base station as well as how many terminals 306 may have actively handed over a call to a particular base station.

Terminals 306 frequently act on roaming or handover requests, which are typically based on relative signal strength or link quality between the current base and a new/target base. The roaming or handover requests may be generated by DECT protocol executed by the terminal itself, in which case the requests are "received" in the sense that they are processed by the terminal as part of a software-implemented method, e.g., by a handover manager 328, which receives input from another process, e.g., the DECT protocol implementation executing on the terminal.

In the system 300, when a terminal 306 acts on a roaming or handover request that directs the terminal 306 to roam or handover a call to a target base, instead of automatically granting the request the handover manager 328 first determines whether to override the request to prevent roaming or handover to the target base when the target base does not have an open call slot for roaming or handover. The handover manager 328 overrides the request if the stored capacity information of the base station indicates that the target base station does not have an open call slot for roaming or handover.

In embodiments, the handover manager 328 overrides the standard DECT protocol operation (which would automatically, in conventional systems, force the terminals to roam or handover to a new base) whenever the signal strength and/or link quality of a current base station is below a lower threshold and the signal strength and/or link quality of a target base station is above an upper threshold. By virtue of the features of the disclosed embodiments, instead of initiating potentially unnecessary actions as described herein (e.g., in which a terminal localizes to a new base that does not have slot capacity to accommodate the roaming or handover of the new terminal, thereby forcing the new terminal back to the original base), which can disrupt communications and cause lower battery life, the terminals 306 by virtue of the handover manager 328 may ignore or override the request from the DECT protocol and thus take no action if the new base does not have slot capacity. On the other hand, if the new base does have slot capacity, then the handover manager 328 acts on the roaming/handover request.

Referring again to FIG. 3, in disclosed embodiments, the system 300 may maintain status information related to the status of the base stations (e.g., 302, 304) in the site-wide Volatile Real-Time Database (VRTDB) 318. The VRTDB 318 includes a base status table which contains a status record for each base station in the system 300. The status record includes the capacity information of each base station, i.e., wireless terminal localization status information specifying the number of wireless terminals currently localized to each of respective base stations, (e.g., 302, 304), and active call handover status information specifying the number of active call handovers at each respective base station. The status record may also include information as to which terminals 306 are currently localized to each base station, and which terminals have active call handovers at each base station.

In examples, thresholds are established for a maximum number of additional handovers (e.g., 2 or 3), as well as to limit the total number of localizations to a set number per base (e.g., 8). Reporting in the broadcast channel indicates whether and how much roaming and handover capacity exists per base station (e.g., 302, 304) in real time. Accordingly, the system 300 uses base localization and handover status polling to continuously update the VRTDB 318.

Localization status information of a terminal 306 can be reported to an attached base station from the terminal 306 as the terminal 306 localizes to the base station, at which point the base station can update the site-wide VRTDB 318. Similarly, when an active call handover to a base occurs, the terminal 306 can report such active call handover status information to the attached base station from the terminal 306. The information can be recorded in the VRTDB 318, e.g., as fields in each status record. A status record may therefore hold capacity information for the base stations, which includes, for example, wireless terminal localization status information and active call handover status information for the base stations.

In implementations, the VRTDB 318 may be part of a distributed configuration subsystem which is responsible for indicating/managing configuration and capacity information throughout the system 300. For example, a Terminal 1, upon localizing to Secondary Base 1 or performing an active call handover to Secondary Base 1, sends its status information (localization status or active call handover status) to Secondary Base 1. Secondary Base 1 enters the status information into the VRTDB record for Secondary Base 1, thereby updating the capacity information of Secondary Base 1, which then flows toward the Primary Base. The Primary Base then sends the record to Secondary Base 2 as part of the routine transmission of VRTDB data. The Primary and Secondary Bases broadcast the capacity information to the Terminals. Thus, eventually the entire system is informed of the capacity information of Secondary Base 1, for example. A similar process can occur for other terminals attached to other bases. Accordingly, the VRTDB 318 can be continuously updated to reflect dynamically changing status conditions of the terminals and the bases, and this information is broadcast to the terminals.

Accordingly, in the system 300, the capacity information received by the terminals 306 is obtained from a shared database of the base stations (e.g., VRTDB 318), the shared database comprising capacity information of other base stations of the one or more base stations 302, 304. Thus, the shared database of capacity information is stored at each of the one or more base stations 302, 304.

It is noted that the VRTDB 318 is shown in FIG. 3 as being located in the primary base station 302 but this is just an example and the VRTDB 318 may be located in any suitable location even if not formally a part of the primary base station 302. In any event the VRTDB 318 can be accessible to all primary or secondary base stations as described herein.

Figure 4:
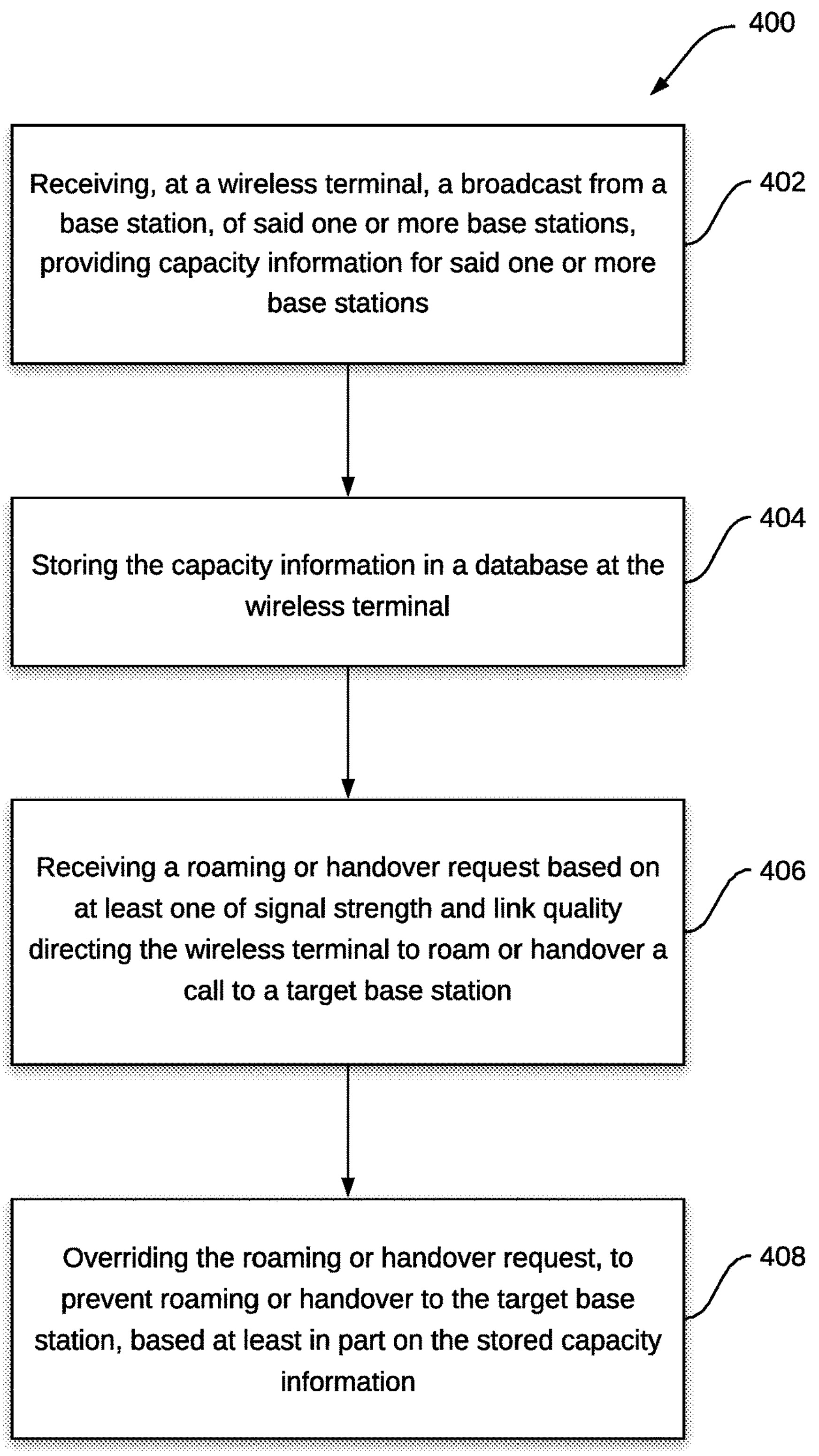
FIG. 4 is a flowchart of a method performed by a roaming and handover load balancing system in a multicell wireless communication network, according to an example embodiment.

FIG. 4 is a flowchart of a method 400 performed by a roaming and handover load balancing system in a multicell wireless communication network, such as the system 300 of FIG. 3, according to an example embodiment. As shown in the example embodiment of FIG. 3, the network comprises one or more base stations 302, 304 which communicate with wireless terminals 306, each base station 302, 304 having a number of call slots to communicate with wireless terminals 306. Each wireless terminal 306 includes a roaming/handover manager (referred to herein as a "handover manager") 328 to override roaming or handovers to a new base station 302, 304 if the new base station 302, 304 is already at available slot capacity. In an example embodiment the handover manager 328 comprises at least one processor (not shown in FIG. 3) in the terminal 306 and a memory (also not shown in FIG. 3) operatively coupled to the at least one processor. The memory includes instructions that, when executed, cause the at least one processor to perform the method 400.

The method 400 includes receiving (402), at a wireless terminal 306, a broadcast from a base station, of the one or more base stations 302, 304, providing capacity information for the one or more base stations. The capacity information may be continually broadcast by the base station to all of the wireless terminals associated with the base station. In embodiments, each base station 302, 304 broadcasting the capacity information may use the "dummy bearer" broadcast channel to continuously broadcast the capacity information to the wireless terminals 306 associated with the base, as described herein.

The capacity information may include wireless terminal localization status information and active call handover status information for the one or more base stations 302, 304. The wireless terminal localization status information may specify a number of wireless terminals 306 currently localized to each of the one or more base stations 302, 304. The active call handover status information may specify a number of active call handovers at each of the one or more base stations 302, 304. The method also includes storing (404) the capacity information in a database at the wireless terminal, such as file storage 326 of FIG. 3.

The method further includes receiving (406) a roaming or handover request based on at least one of signal strength and link quality, directing the wireless terminal 306 to roam or handover a call to a target base station. In an example embodiment the roaming or handover request is generated by DECT protocol.

The method further includes overriding (408) the roaming or handover request, to prevent roaming or handover to the target base station, based at least in part on the stored capacity information. This override can be performed by, e.g., handover manager 328 as described in connection with FIG. 3. In example embodiments, the roaming or handover request is overridden if the stored capacity information of the base station indicates that the target base station does not have an open call slot for roaming or handover, respectively.

The capacity information received by the terminals 306 is obtained from a shared database of the base stations 302, 304 such as VRTDB 318 described in connection with FIG. 3, in which the shared database comprises capacity information of other base stations of the one or more base stations 302, 304. Thus, the shared database of capacity information is stored at each of the one or more base stations 302, 304.

EXAMPLE IMPLEMENTATIONS

As described herein, disclosed embodiments are directed to optimizing load balancing in a multicell network during roaming and handover of wireless terminals among the bases. An example aspect provides a wireless system broadcast status for roaming and handover load balancing.

As described herein, in conventional techniques, the terminal has no way to know in advance whether a target base station to which the terminal decides to roam or handover actually has the required capacity to accept the new terminal. If there is no capacity at the target base station, this may result in a rejection of the terminal and thus wasted battery or audio disruption. The disclosed technology imparts the base station capacity status to the terminal which is provisioned with a system/method to enable the terminal to determine, based on the target base capacity status, whether to attempt roaming or handover. If there is no capacity at the target base then the normal procedure of the terminal of roaming or handing over to the target base anyway is blocked or overridden.

Example embodiments provide systems and methods to obtain wireless terminal localization status information and active call handover status information for wireless terminals and bases in the network, and store this information in a database which is then shared across different bases in a multicell system.

Example embodiments provide systems and methods to continuously broadcast the database status information in real time to all of the wireless terminals associated with a particular base station in a multicell system.

Example embodiments provide wireless terminal capability to only perform roaming to a target base when the roaming status information obtained from a target base station indicates adequate slot capacity on the target base station and meets certain criteria. Example embodiments also provide wireless terminal capability to only allow in-call handover to a target base when the handover status information obtained from a target base station indicates adequate slot capacity on the target base station and meets certain criteria.

Example embodiments can result in improved battery life of a terminal during roaming and can avoid unnecessary connection setup and channel usage (e.g., in a DECT system) to set up a new localization at a target base, only to be rejected and forced back over to the original base station. For the handover situation it would also prevent unnecessary connection setup (e.g., in a DECT system) and channel usage to set up a new connection at a target base and can also remove interruptions in the audio connection for the call.

As described herein, disclosed embodiments have various components in the disclosed system, or various methods using the disclosed system, to handle the described operations including base localization and handover status polling; status storage in a local database; real-time sharing of the database across a multi-cell system; wireless broadcast of status information to wireless terminals (of all system base stations); gathering and storage of status information at the wireless terminals; wireless terminal methods to control the behavior for roaming or localizing to a new base only when available capacity at the new base is indicate; wireless terminal logic to control he behavior for in-call handover to a new base only when available capacity at the new base is indicated.

It should be noted that the terms “optimize,” “optimal” and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The claimed software elements can be realized on a variety of telecommunications systems or subsystems. The following description, in conjunction with the disclosed embodiments described in the foregoing, provides representative, non-limiting examples of potential telecommunications systems or subsystems that could be used to execute the claimed software elements.

At a high level, a telecommunications system or subsystem typically includes, but is not limited to, communication devices, networks, base stations, servers, and a variety of other hardware and software components. Communication devices may include a broad range of devices such as cordless telephones, mobile phones, smartphones, computers, tablets, and other types of devices capable of sending and receiving communication signals. These devices usually include at least one processor, memory, a user interface (such as a display, keyboard, or touch screen), and a network interface for connecting to a network.

The network component of a telecommunications system or subsystem can take various forms, including multicell systems, e.g., Digital Enhanced Cordless Telecommunications (DECT), public switched telephone networks (PSTN), the Internet, mobile networks (e.g., 3G, 4G, 5G), local area networks (LAN), wide area networks (WAN), and others. Base stations and/or servers are also commonly part of telecommunications systems, facilitating the storage, processing, and exchange of data. Like the aforementioned communication devices, these elements generally include a processor and memory for executing software applications, as well as network interfaces for communicating with the network and other devices.

Software elements in the telecommunications system may include operating systems, device drivers, networking software, applications, and other types of software. These software elements can be executed on communication devices, base stations, servers, or other hardware components of the telecommunications systems or subsystems. The claimed software elements may be embodied as computer program code that is executed on one or more of the hardware components of the telecommunications system or subsystem. This code could be stored on a non-transitory computer-readable medium that is part of the communication device, base station, server, or other component, or it could be stored on an external storage device, network storage, or cloud storage.

It should be noted that the described telecommunications systems and subsystems are illustrative and that the claimed software elements can be executed on any suitable telecommunications system or subsystem. The specific configuration of the telecommunications system or subsystem may vary depending on the requirements of the application, performance characteristics of the system, cost considerations, and other factors. The scope of the invention is not limited to the specific telecommunications systems and subsystems described herein but includes any and all systems or subsystems suitable for implementing the present invention.

The foregoing detailed description has presented various implementations of the devices and/or processes through the use of block diagrams, schematics, and illustrative examples. As such block diagrams, schematics, and examples include one or more functions and/or operations, it should be understood by those skilled in the art that each function and/or operation within these block diagrams, flowcharts, or examples can be implemented individually and/or collectively by employing a wide range of hardware, software, firmware, or any combination thereof. It should also be recognized by those skilled in the art that the methods or algorithms described herein may incorporate additional steps, may exclude some steps, and/or may execute steps in an order different from the one specified. The various implementations described above can be combined to create additional implementations.

These modifications and other changes can be made to the implementations in light of the above-detailed description. Generally, the terms used in the following claims should not be construed to limit the claims to the specific implementations disclosed in the specification and the claims. Instead, they should be interpreted to encompass all possible implementations, along with the full scope of equivalents to which such claims are entitled. Consequently, the claims are not limited by the disclosure but are intended to cover all possible implementations within their scope.

What is claimed is:

1. A method of performing roaming and handover load balancing in a multicell wireless communication network, the network comprising one or more base stations, each base station having a number of call slots to communicate with wireless terminals, the method comprising:

receiving, at a wireless terminal, a broadcast from a base station, of said one or more base stations, providing capacity information for said one or more base stations, the capacity information comprising wireless terminal localization status information and active call handover status information for said one or more base stations;

storing the capacity information in a database at the wireless terminal;

receiving a roaming or handover request based on at least one of signal strength and link quality directing the wireless terminal to roam or handover a call to a target base station; and overriding the roaming or handover request, to prevent roaming or handover to the target base station, based at least in part on the stored capacity information, wherein the capacity information further indicates whether the target base station has an open call slot available for the roaming or handover, and wherein overriding the roaming or handover request comprises ignoring the roaming or handover request and refraining from initiating localization with, or handover signaling to, the target base station when the stored capacity information indicates that the target base station does not have the open call slot.

2. The method of claim 1, wherein the wireless terminal localization status information specifies a number of wireless terminals currently localized to each of said one or more base stations.

3. The method of claim 1, wherein the active call handover status information specifies a number of active call handovers at each of said one or more base stations.

4. The method of claim 1, wherein the capacity information is continually broadcast by the base station to all of the wireless terminals associated with the base station.

5. The method of claim 1, wherein the capacity information is obtained from a shared database of the base station, the shared database comprising capacity information of other base stations of said one or more base stations.

6. The method of claim 5, wherein the shared database of capacity information is stored at each of said one or more base stations.

7. The method of claim 1, wherein, in said receiving the roaming or handover request, the roaming or handover request is generated by DECT protocol.

8. The method of claim 1, wherein, in said overriding the roaming or handover request, the request is overridden if the stored capacity information of the base station indicates that the target base station does not have an open call slot for roaming or handover, respectively.

9. A system for performing roaming and handover load balancing in a multicell wireless communication network, the network comprising one or more base stations, each base station having a number of call slots to communicate with wireless terminals, the system comprising:

at least one processor in a base station; and memory operatively coupled to said at least one processor, the memory including instructions that, when executed, cause said at least one processor to perform:

receiving, at a wireless terminal, a broadcast from a base station, of said one or more base stations, providing capacity information for said one or more base stations, the capacity information comprising wireless terminal localization status information and active call handover status information for said one or more base stations;

storing the capacity information in a database at the wireless terminal;

receiving a roaming or handover request based on at least one of signal strength and link quality directing the wireless terminal to roam or handover a call to a target base station; and overriding the roaming or handover request, to prevent roaming or handover to the target base station, based at least in part on the stored capacity information, wherein the capacity information further indicates whether the target base station has an open call slot available for the roaming or handover, and wherein overriding the roaming or handover request comprises ignoring the roaming or handover request and refraining from initiating localization with, or handover signaling to, the target base station when the stored capacity information indicates that the target base station does not have the open call slot.

10. The system of claim 9, wherein the wireless terminal localization status information specifies a number of wireless terminals currently localized to each of said one or more base stations.

11. The system of claim 9, wherein the active call handover status information specifies a number of active call handovers at each of said one or more base stations.

12. The system of claim 9, wherein the capacity information is continually broadcast by the base station to all of the wireless terminals associated with the base station.

13. The system of claim 9, wherein the capacity information is obtained from a shared database of the base station, the shared database comprising capacity information of other base stations of said one or more base stations.

14. The system of claim 13, wherein the shared database of capacity information is stored at each of said one or more base stations.

15. The system of claim 9, wherein, in said receiving the roaming or handover request, the roaming or handover request is generated by DECT protocol.

16. The system of claim 9, wherein the memory further includes instructions that, when executed, cause said at least one processor to perform:

in said overriding the roaming or handover request, the request is overridden if the stored capacity information of the base station indicates that the target base station does not have an open call slot for roaming or handover, respectively.

17. One or more non-transitory computer-readable storage media comprising instructions which, when executed by at least one processor, cause said at least one processor to carry out a method of performing roaming and handover load balancing, as performed in a multicell wireless communication network by one or more wireless terminals which communicate with one or more base stations, each base station having a number of call slots to communicate with the wireless terminals, the method comprising:

receiving, at a wireless terminal, a broadcast from a base station, of said one or more base stations, providing capacity information for said one or more base stations, the capacity information comprising wireless terminal localization status information and active call handover status information for said one or more base stations;

storing the capacity information in a database at the wireless terminal;

receiving a roaming or handover request based on at least one of signal strength and link quality directing the wireless terminal to roam or handover a call to a target base station; and overriding the roaming or handover request, to prevent roaming or handover to the target base station, based at least in part on the stored capacity information, wherein the capacity information further indicates whether the target base station has an open call slot available for the roaming or handover, and wherein overriding the roaming or handover request comprises ignoring the roaming or handover request and refraining from initiating localization with, or handover signaling to, the target base station when the stored capacity information indicates that the target base station does not have the open call slot.

18. The one or more non-transitory computer-readable storage media of claim 17, wherein the wireless terminal localization status information specifies a number of wireless terminals currently localized to each of said one or more base stations.

19. The one or more non-transitory computer-readable storage media of claim 17, wherein the active call handover status information specifies a number of active call handovers at each of said one or more base stations.

20. The one or more non-transitory computer-readable storage media of claim 17, wherein, in said overriding the roaming or handover request, the request is overridden if the stored capacity information of the base station indicates that the target base station does not have an open call slot for roaming or handover, respectively.

* * * * *